United States Patent
McCaffrey

(10) Patent No.: US 11,867,067 B2
(45) Date of Patent: Jan. 9, 2024

(54) ENGINE ARTICLE WITH CERAMIC INSERT AND METHOD THEREFOR

(71) Applicant: RAYTHEON TECHNOLOGIES CORPORATION, Farmington, CT (US)

(72) Inventor: Michael G. McCaffrey, Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/831,944

(22) Filed: Jun. 3, 2022

(65) Prior Publication Data
US 2023/0392511 A1   Dec. 7, 2023

(51) Int. Cl.
*F01D 5/28*  (2006.01)
*F01D 11/08* (2006.01)
*F01D 5/12*  (2006.01)

(52) U.S. Cl.
CPC ............... *F01D 11/08* (2013.01); *F01D 5/12* (2013.01); *F01D 5/284* (2013.01); *F05D 2240/55* (2013.01); *F05D 2300/6033* (2013.01); *F05D 2300/614* (2013.01)

(58) Field of Classification Search
CPC .......................... F01D 5/284; F05D 2300/6033
See application file for complete search history.

(56) References Cited

U.S. PATENT DOCUMENTS

| | | | |
|---|---|---|---|
| 6,843,462 B2 | 1/2005 | Nakamura | |
| 7,018,480 B2 | 3/2006 | Nakamura | |
| 7,066,717 B2 | 6/2006 | Morrison et al. | |
| 9,068,464 B2* | 6/2015 | Morrison | B23P 15/04 |
| 10,450,235 B2 | 10/2019 | Gray et al. | |
| 10,465,534 B2 | 11/2019 | Freeman et al. | |
| 10,794,289 B2* | 10/2020 | Groves, II | F02C 3/04 |
| 11,220,924 B2 | 1/2022 | Fernandez | |
| 11,466,580 B2* | 10/2022 | Underwood | F01D 5/284 |
| 2008/0203236 A1* | 8/2008 | Mazzola | F01D 5/147 |
| | | | 244/35 R |
| 2017/0030208 A1 | 2/2017 | Hillier | |
| 2021/0032995 A1* | 2/2021 | Razzell | C04B 35/573 |
| 2021/0095574 A1 | 4/2021 | Fernandez | |

FOREIGN PATENT DOCUMENTS

| EP | 3103964 | 8/2018 |
|---|---|---|
| WO | 2021123577 | 6/2021 |

OTHER PUBLICATIONS

European Search Report for European Patent Application No. 23177255.9 dated Oct. 24, 2023.

* cited by examiner

*Primary Examiner* — Eldon T Brockman
(74) *Attorney, Agent, or Firm* — Carlson, Gaskey & Olds, P.C.

(57) ABSTRACT

An article includes a gas turbine engine component that has a ceramic matrix composite (CMC) body and a fiber layer circumscribing a cavity. There is a ceramic insert incorporated into the CMC article body, the insert bordering the cavity.

6 Claims, 4 Drawing Sheets

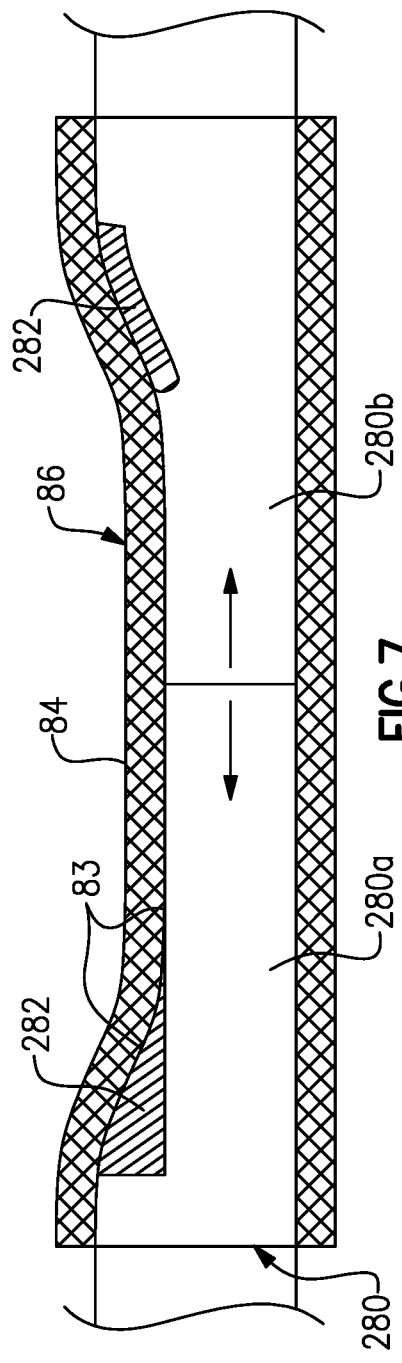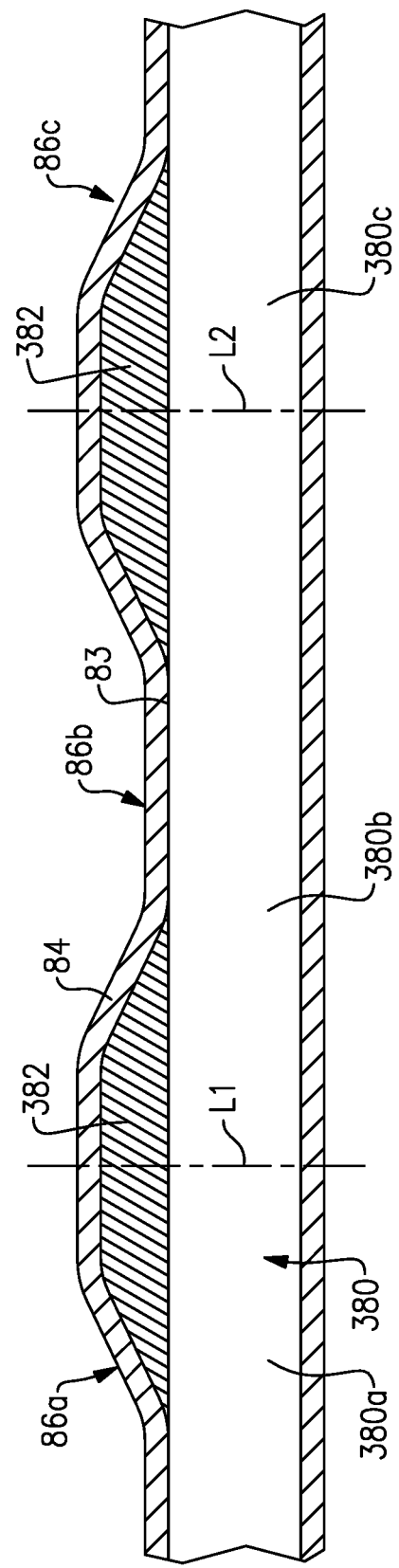

ENGINE ARTICLE WITH CERAMIC INSERT AND METHOD THEREFOR

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Components in the turbine section are typically formed of a superalloy and may include thermal barrier coatings to extend temperature capability and lifetime. Ceramic matrix composite ("CMC") materials are also being considered for turbine components. Among other attractive properties, CMCs have high temperature resistance. Despite this attribute, however, there are unique challenges to manufacturing and implementing CMCs in such components.

SUMMARY

An article according to an example of the present disclosure includes a gas turbine engine component that has a ceramic matrix composite (CMC) body that includes a fiber layer circumscribing a cavity, and a ceramic insert incorporated into the CMC body, the insert bordering the cavity.

In a further embodiment of any of the foregoing embodiments, the gas turbine engine component is an airfoil and the ceramic insert is a rib in the airfoil.

In a further embodiment of any of the foregoing embodiments, the gas turbine engine component is a blade outer air seal and the ceramic insert is a seal seat in the blade outer air seal.

In a further embodiment of any of the foregoing embodiments, the gas turbine engine component is an airfoil and the ceramic insert is an annular flange in the airfoil.

In a further embodiment of any of the foregoing embodiments, the ceramic insert is a monolithic ceramic.

In a further embodiment of any of the foregoing embodiments, the fiber layer includes silicon carbide fibers.

A method according to an example of the present disclosure includes providing a ceramic insert on a mandrel. The mandrel and the ceramic insert together define a peripheral working surface, and then forming a fiber preform by wrapping a fiber layer around the mandrel and the ceramic insert so as to conform to the peripheral working surface. The mandrel is then removed from the fiber preform to leave a cavity in the fiber preform. The ceramic insert remains in the fiber preform and borders the cavity. The fiber preform is then densified with a ceramic matrix to form a gas turbine engine component.

In a further embodiment of any of the foregoing embodiments, the mandrel is a rod.

In a further embodiment of any of the foregoing embodiments, the mandrel is segmented.

In a further embodiment of any of the foregoing embodiments, the mandrel is multi-piece.

In a further embodiment of any of the foregoing embodiments, the mandrel is of uniform cross-section.

In a further embodiment of any of the foregoing embodiments, the wrapping includes braiding.

In a further embodiment of any of the foregoing embodiments, the removing of the mandrel includes mechanically removing the mandrel.

A system according to an example of the present disclosure includes a mandrel, and a ceramic insert disposed on the mandrel. The mandrel and the ceramic insert together define a peripheral working surface. A fiber layer is wrapped around the mandrel and the ceramic insert and conforms to the peripheral working surface.

In a further embodiment of any of the foregoing embodiments, the mandrel defines a central axis, the ceramic insert is located at a first axial position, and further includes an additional ceramic insert disposed on the mandrel at a second axial position that is axially-spaced from the first axial position.

In a further embodiment of any of the foregoing embodiments, the mandrel is at least one of the following: the mandrel is a rod, the mandrel is segmented, or the mandrel is multi-piece.

In a further embodiment of any of the foregoing embodiments, the fiber layer is a braided fiber layer.

In a further embodiment of any of the foregoing embodiments, the ceramic insert is selected from the group consisting of a rib, a seal seat, and an annular flange.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 7 depicts another example lay-up process and set-up for fabricating a fiber preform of a CMC article.

FIG. 8 depicts another example lay-up process and set-up for fabricating a fiber preform for multiple CMC articles.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
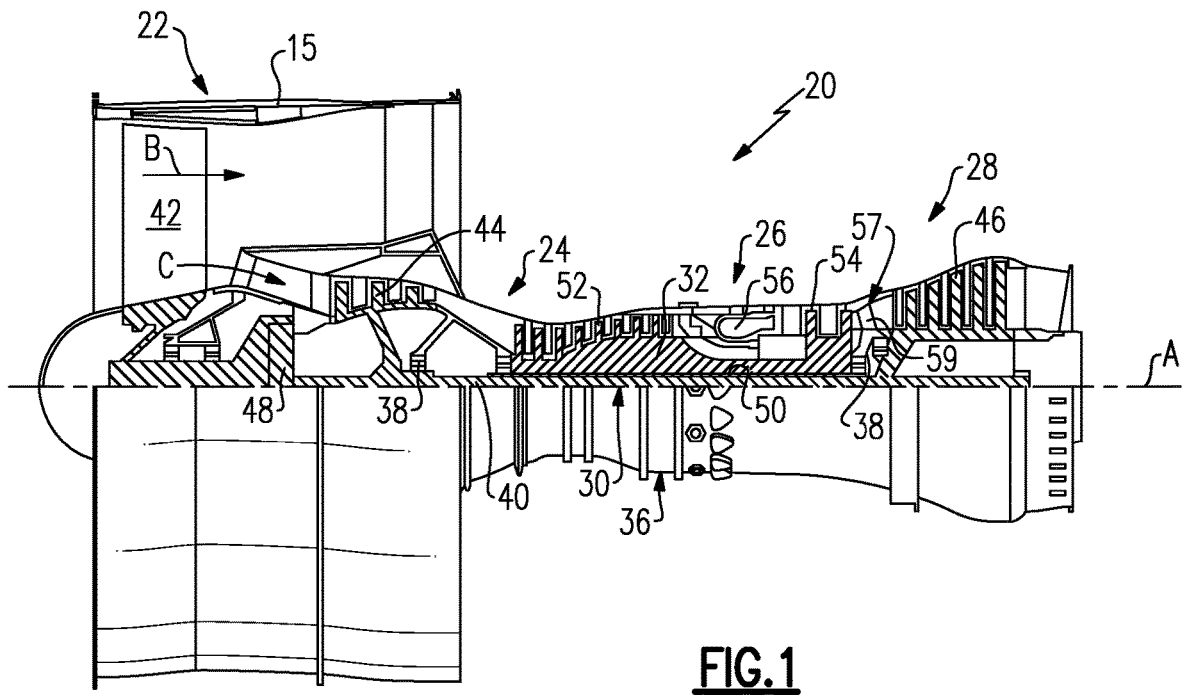
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
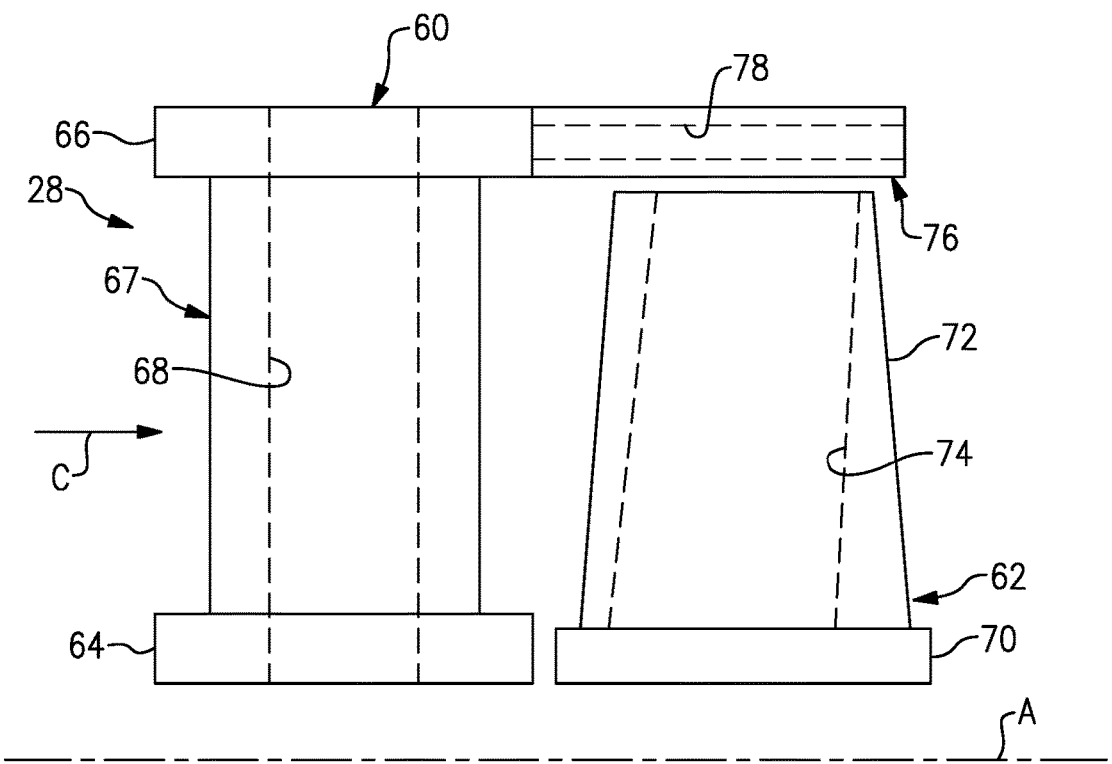
FIG. 2 illustrates a portion of a turbine section of the engine.

FIG. 2 illustrates a portion of the turbine section 28 of the engine 20. The turbine section 28 includes a row of vanes 60 and a row of blades 62. The row of vanes 60 and the adjacent row of blades 62 together constitute a stage. The turbine section 28 may include multiple stages. Each vane 60 includes inner and outer platforms 64/66 and an airfoil section 67 that extends between the platforms 64/66. The vane 60 is hollow and has a cavity 68 that extends there through for conveying cooling air to downstream structures, such as tangential onboard injectors (TOBIs). Each blade 62 includes a platform 70 and an airfoil section 72 that extends there from. The airfoil section 72 has an internal cavity 74.

There is a row of blade outer air seals (BOAS) 76 arranged near the tips of the blades 62. Each BOAS 76 includes a cavity 78 for conveying cooling air. The BOAS 76 may be supported from an engine turbine case or other static structure. The BOAS 76 provides sealing at the tips of the blades 62 to reduce the leakage flow of combustion gases around the tips of the blades 62. The constituent portions of each of the vane 60, blade 62, and BOAS 76 above constitute the body of each of these articles. A "cavity" as used herein may include a relatively large volume, used for bulk cooling air flow for example, or a relatively smaller passage or passages, used for cooling portions of the airfoil section 72 for example. It is to be appreciated that the vane 60, blade 62, and BOAS 76 are shown schematically and may include additional structures that are known to those of ordinary skill in the art.

The body of any or each of the vane 60, the blade 62, and the BOAS 76 is formed from a ceramic matrix composite (CMC) material. It is also to be appreciated that although the examples herein are presented in context of the vane 60, the blade 62, and/or the BOAS 76, the examples are also applicable to other gas turbine engine components that are formed of CMC. A CMC material is comprised of a ceramic reinforcement, which is usually continuous ceramic fibers, in a ceramic matrix. Example ceramic matrices are silicon-containing ceramic, such as but not limited to, a silicon carbide (SiC) matrix or a silicon nitride (Si3N4) matrix. Example ceramic reinforcements of the CMC are silicon-containing ceramic fibers, such as but not limited to, silicon carbide (SiC) fiber or silicon nitride (Si3N4) fibers. The CMC material may be, but is not limited to, a SiC/SiC ceramic matrix composite in which SiC fiber layers are disposed within a SiC matrix. The fiber layers have a fiber architecture, which refers to an ordered arrangement of the fiber tows relative to one another, such as a 2D woven layer or a 3D structured layer. Unlike a CMC, a monolithic ceramic does not contain fibers or reinforcement and is formed of a single material, such as monolithic silicon carbide (SiC) or monolithic silicon nitride (Si3N4).

Hollow CMC gas turbine engine components may be fabricated in a lay-up process that involves arranging one or more fiber layers around a mandrel that replicates the geometry of the cavity in the component. For example, first a fiber preform is formed by braiding fiber layers around the mandrel. The mandrel is then removed, leaving the cavity and the braided fiber layers encompassing the cavity. The preform is then subjected to additional processes to produce the end-use article. For instance, portions of the preform may be re-shaped to a desired design geometry and/or to accommodate installation of inserts, the preform may be trimmed of excess fibers, or sub-components may be installed into the preform.

Each additional process that the preform is subjected to involves handling the preform in some manner, which increases the chances that the geometry of the preform from the braiding step will be inadvertently altered and deviate from the desired design geometry. Therefore, to the extent that an additional process can be eliminated, the chances of altering the geometry will be reduced. Nevertheless, this is easier said than done, as it is challenging to eliminate steps while still meeting performance and manufacturability requirements imposed by the article design. Along these lines, as disclosed herein, the elimination of one or more additional processing steps for such fiber preforms may be facilitated by incorporating a ceramic insert into the preform at the fiber layer lay-up stage.

Figure 3:
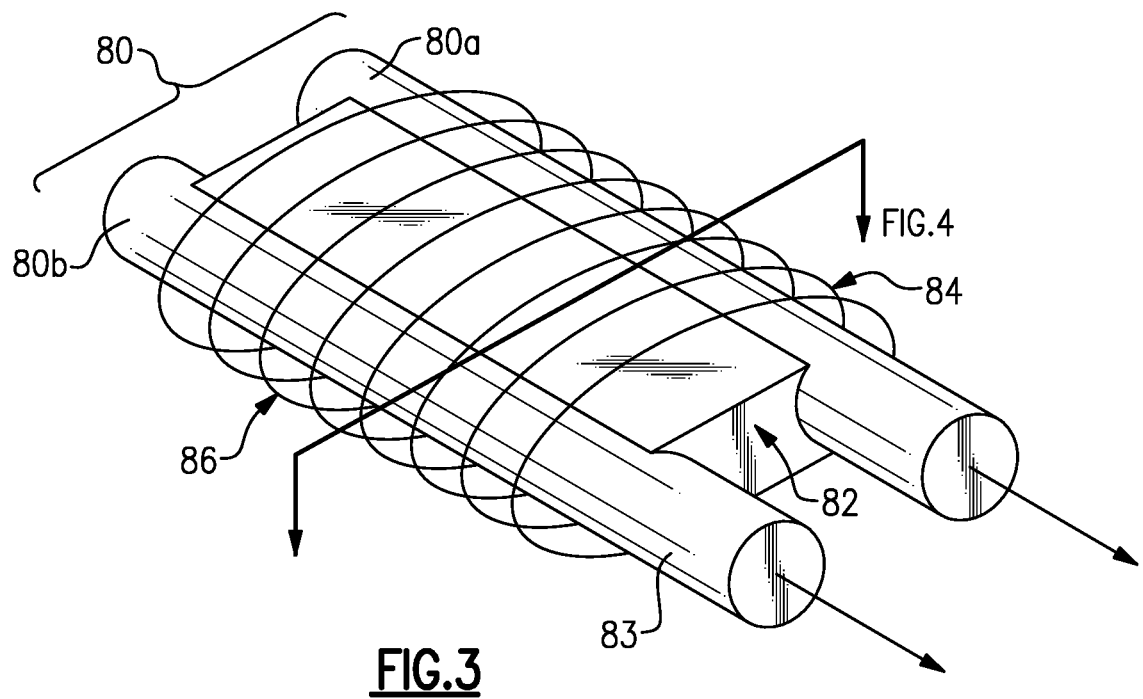
FIG. 3 depicts an example lay-up process and set-up for fabricating a fiber preform of a CMC article.
Figure 4:
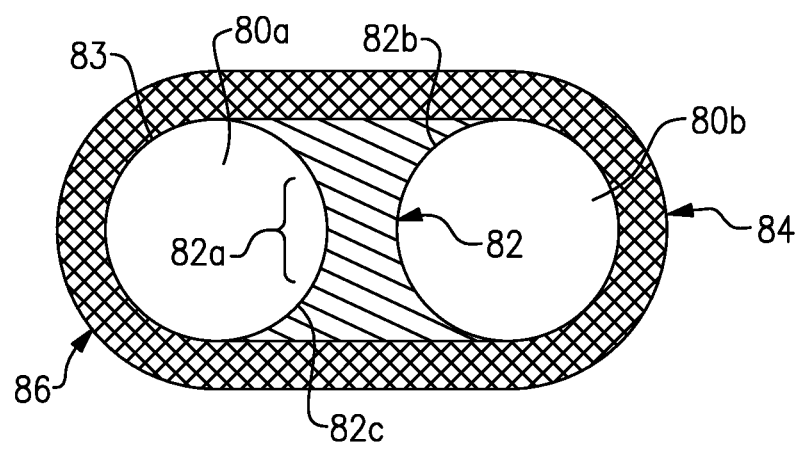
FIG. 4 illustrates a sectioned view from FIG. 3.

FIG. 3 illustrates representative features of a fiber layer lay-up process for fabricating an airfoil, such as the vane 60 or the blade 62. FIG. 4 is a sectioned view of FIG. 3. The process involves a mandrel 80 that may be formed of graphite, but is not limited thereto. In this case, the mandrel 80 is a multi-piece mandrel that includes a first mandrel rod piece 80*a* and a second mandrel rod piece 80*b*. The cross-sectional geometries of the mandrel rod pieces 80*a*/80*b* may be the same or different from each other and correspond to the desired design geometry of the cavity 68/74 that is to be formed. In this regard, the cross-sections may be, but are not limited to, oval, circular, stadium shape, wing shape, portion of a wing shape, or other desired geometry of the cavity 68/74 or sub-cavities that make up the cavity 68/74. The cross-sections of each mandrel rod piece 80*a*/80*b* may be constant from end-to-end or tapered from one end or intermediate location to the other end or other intermediate location.

The cavity 68/74 is to be divided into sub-cavities by a rib that extends from one side of the airfoil to the other, e.g., from a pressure side to a suction side. Ribs may sometimes be formed after a lay-up process by adding structures to the fiber preform prior to densification with the matrix material, or by adding filler material (often colloquially referred to as a noodle) along the lengths of the mandrel rod pieces. As indicated above, processing after formation of the fiber preform increases the chances of inadvertently altering the geometry. Moreover, filler materials may shift during handling or processing and ultimately cause the rib to deviate from its design position and/or design geometry. In this regard, rather than a filler material or an additional process after lay-up, a ceramic insert 82 is used between the mandrel rod pieces 80*a*/80*b*.

The ceramic insert 82 may be a pre-fabricated from a CMC or a monolithic ceramic. The cross-sectional geometry of the ceramic insert 82 in this example has a central wall 82*a* and flared ends 82*b*/82*c* (FIG. 4). The flared ends 82*b*/82*c* are substantially flush against the mandrel rod pieces 80*a*/80*b*. Optionally, the mandrel rod pieces 80*a*/80*b* and ceramic insert 82 may be held together using a fixture or adhesive material, such as a tackifier, wax, or preceramic polymer. Tackifiers and waxes may later burn off during thermal cycles used for densification, while preceramic polymer thermally converts to ceramic.

The periphery formed by the outline of the mandrel rod pieces 80*a*/80*b* and the ceramic insert 82 defines a working surface 83 around which one or more fiber layers 84 will be wrapped to form a fiber preform 86. For example, the fiber layer or layers 84 are braided (e.g., triaxial braiding) around the mandrel rod pieces 80*a*/80*b* and ceramic insert 82 and conform to the working surface 83 so as to be in close intimate contact with the periphery surfaces of the mandrel rod pieces 80*a*/80*b* and the ceramic insert 82. As will be appreciated, the fiber architecture of the fiber layer or layers 84 herein are not limited to braiding. As used herein, the arrangement of a mandrel, a fiber layer(s) on the mandrel, and a ceramic insert on the mandrel is considered to be a "system," i.e., a system representing a set-up for fabrication of CMC articles, such as the vane 60, the blade 62, or the BOAS 76.

The mandrel rod pieces 80*a*/80*b* are then removed from the fiber preform 86 after braiding. The technique by which the mandrel rod pieces 80*a*/80*b* are removed is not particularly limited. Most typically, the mandrel rod pieces 80*a*/80*b* will be removed mechanically by pulling the pieces 80*a*/80*b* out from the fiber preform 86. Other techniques, such as but not limited to, chemical removal and thermal removal may alternatively be used or be used in combination. The ceramic insert 82 remains in the fiber preform 86 after removal of the mandrel rod pieces 80*a*/80*b* and borders the cavity left by the mandrel rod pieces 80*a*/80*b*.

The fiber preform 86 may be subjected to one or more additional processes prior to densification, such as trimming steps to remove excess fibers or forming operations to shape portions of the fiber preform (e.g., to form one or more platforms, flanges, etc.). However, no further process are required to install a rib because the ceramic insert 82 remains in the fiber preform 86 and serves as the rib. The fiber preform 86 (with the ceramic insert 82) is then subjected to densification in which the ceramic matrix provided. Although not limited, the densification process may include chemical vapor infiltration, polymer infiltration and pyrolysis or combinations of these and/or other ceramic processes.

In addition to facilitating elimination of steps for forming the rib after formation of the fiber preform 86, the ceramic insert 82 may also provide surfaces that act as seal seats for sealing. For instance, the ceramic insert 82 can be prefabricated with a high density, low surface roughness, and/or precision geometry to enhance sealing. A high density reduces surface porosity and thus facilitates the provision of a smooth surface to seal against. The ceramic insert 82 may also be polished or coated to form smooth surfaces to seal against. Moreover, the ceramic insert 82 may be fabricated to high dimensional tolerances to enhance relative positioning of the seal seat. If a ceramic insert were instead installed into the fiber preform after forming the fiber preform, the installation may increase the chances of inadvertently altering the geometry of the fiber preform. Likewise, machining processes after formation of the fiber preform that are used to create or smooth out seal seats may also increase the chances of inadvertently altering the geometry of the fiber preform. The use of the ceramic insert 82 thus facilitates elimination of those processes.

Figure 5:
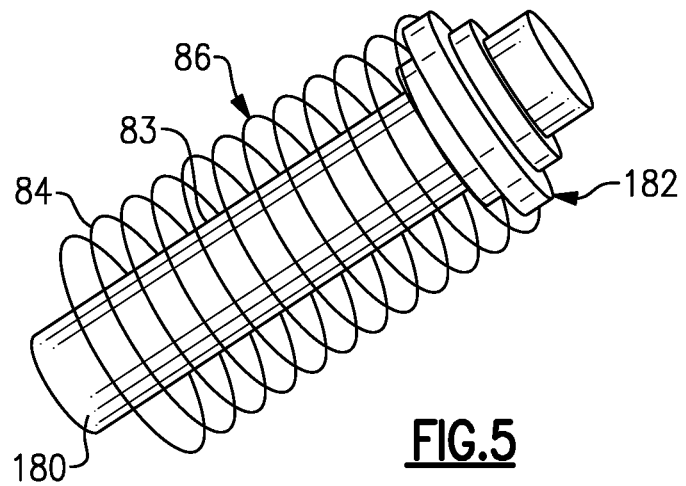
FIG. 5 depicts another example lay-up process and set-up for fabricating a fiber preform of a CMC article.
Figure 6:
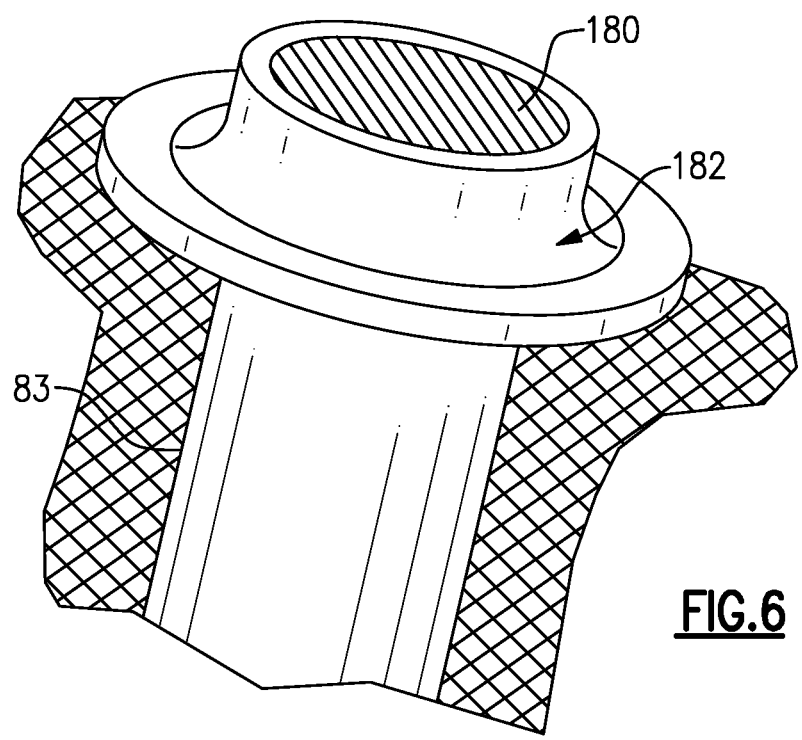
FIG. 6 illustrates a sectioned view from FIG. 5.

FIG. 5 illustrates representative features of another example fiber layer lay-up process for fabricating an airfoil, such as the vane 60 or the blade 62. FIG. 6 is a sectioned view of FIG. 5. The process involves a mandrel 180 (rod) and the ceramic insert 182 is an annular flange. The mandrel 180 extends through the open middle of the annular flange, which may be held on the mandrel 180 as discussed above. The fiber layer or layers 84 are braided around the mandrel 180 and at least a portion of the ceramic insert 182 and conform to the working surface 83 so as to be in close intimate contact with the periphery surfaces of the mandrel 180 and the ceramic insert 182.

The mandrel 180 is then removed from the fiber preform 86, as discussed above. The ceramic insert 182 remains in the fiber preform 86 after removal and borders the cavity left by the mandrel 180. The fiber preform 86 is densified, as also discussed above. The ceramic insert 182 facilitates elimination of steps for forming the annular flange after formation of the fiber preform 86. The annular flange may also provide surfaces that act as seal seats for sealing. For instance, the annular flange is located at a radial end of the airfoil, e.g., an inlet to the cavity in the airfoil and one or more seals may be provided in contact along the surface of the annular flange. An additional annular flange (additional ceramic insert 182) may also be used at the other radial end, e.g., outlet of the cavity in the airfoil. In further examples, the annular flange may also mate with a sub-component that is installed in the airfoil. As an example, a tube may be provided through the cavity of the airfoil, and the annular flange may contact and/or seal with the tube. The enhanced sealing and/or mating with the tube facilitates lowering less pressure loss of cooling air flow and, as a result, efficiency improvements.

The ceramic insert 182 may thus be prefabricated with a high density, low surface roughness, and/or precision geometry to enhance sealing and/or mating with a sub-component. If a ceramic insert were instead installed into the fiber preform after forming the fiber preform, the installation may increase the chances of inadvertently altering the geometry of the fiber preform. Likewise, machining processes after formation of the fiber preform that are used to create or smooth out seal seats or contact surfaces may also increase the chances of inadvertently altering the geometry of the fiber preform.

FIG. 7 illustrates representative features of another example fiber layer lay-up process for fabricating the BOAS 76. The process involves a mandrel 280 that is segmented into first and second mandrel segments 280a/280b. The segments 280a/280b differ from the multi-pieces 80a/80b described above for the mandrel 80 in that the segments 280a/280b are of complementary geometries that fit together to form a single mandrel, while the multi-pieces 80a/80b are of non-complementary geometries that do not fit together. In the example shown, the axial ends of the segments 280a/280b fit together to form a single, elongated mandrel.

One or more ceramic inserts 282 are disposed on the mandrel 280 and may be held in place as discussed above. The fiber layer or layers 84 are braided around the mandrel 280 and the ceramic inserts 282 and conform to the working surface 83 so as to be in close intimate contact with the periphery surfaces of the mandrel 280 and the ceramic insert 282.

The mandrel 280 is then removed from the fiber preform 86. In this case, the segments 280a/280b are pulled in opposite directions so as to be removed from the ends of the fiber preform 86. The ceramic inserts 282 remain in the fiber preform 86 after removal and border the cavity left by the mandrel 280. The fiber preform 86 is then densified, as discussed above. The ceramic inserts 282 may serve as seal seats and/or as attachment support features for installation of the BOAS 76 into the engine 20. The ceramic inserts 282 facilitate elimination of steps for forming seal seats or attachment features after formation of the fiber preform 86. The ceramic inserts 282 may thus be prefabricated with a high density, low surface roughness, and/or precision geometry to enhance sealing and/or geometry for contact with mating sub-components. If a ceramic insert were instead installed into the fiber preform after forming the fiber preform, the installation may increase the chances of inadvertently altering the geometry of the fiber preform. Likewise, machining processes after formation of the fiber preform that are used to create or smooth out seal seats or attachment features may also increase the chances of inadvertently altering the geometry of the fiber preform.

Use of a segmented mandrel also enables a plurality of BOAS 76 articles to be fabricated simultaneously, in one wrapping step. For instance, in FIG. 8 the mandrel 380 is segmented into a plurality of mandrel segments 380a/380b/380c (three shown, but additional segments may be used). In this case, each of the segments 380a/380b/380c is of uniform cross-section along its entire length. The segments 380a/380b/380c are arranged end-to-end. Two or more ceramic inserts 382 are disposed along the mandrel 380. In particular, one of the ceramic inserts 382 is located at a first axial position L1 and the other ceramic insert 382 is located at a second axial position L2 that is axially-spaced from the first axial position L1. The positions L1 and L2 correspond to the locations of the ends of the fiber preforms 86a/86b/86c that will be produced. The fiber layer or layers 84 are then braided around the mandrel 380 and the ceramic inserts 382 and conform to the working surface 83 so as to be in close intimate contact with the periphery surfaces of the mandrel 380 and the ceramic inserts 382.

The mandrel 380 is then removed from the fiber preforms 86a/86b/86c, which at this stage are connected as a braided uni-sleeve. For instance, the segments 380a/380b/380c are pulled in axial directions so as to be removed from the ends of the uni-sleeve. The ceramic inserts 382 remain in the uni-sleeve after removal and border the cavity left by the segments 380a/380b/380c. The uni-sleeve may then be densified, as discussed above. After densification, the densified uni-sleeve is cut at the locations L 1/L2 to form three BOAS 76 articles. Alternatively, the uni-sleeve may be subjected to a low temperature consolidation step to form a brown uni-sleeve, which is then cut at the locations L1/L2 to form three brown BOAS 76 articles. The brown BOAS article are then processed to full densification. In this manner, multiple BOAS 76 articles can be processed in a single wrapping step, rather than three separate wrapping steps to form each individual fiber preform.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature.

Variations and modifications to the disclosed examples may become apparent to those skilled in the art that do not necessarily depart from this disclosure. The scope of legal protection given to this disclosure can only be determined by studying the following claims.

What is claimed is:

1. An article comprising:
    a gas turbine engine component having
        a ceramic matrix composite (CMC) body including a fiber layer circumscribing a cavity, and
        a ceramic insert incorporated into the CMC body, the insert bordering the cavity wherein the ceramic insert is an annular flange, and the fiber layer is braided around the annular flange so as to be in contact with, and conform to, periphery surfaces of the annular flange.

2. The article as recited in claim 1, wherein the ceramic insert is a monolithic ceramic.

3. The article as recited in claim 2, wherein the fiber layer includes silicon carbide fibers.

4. The article as recited in claim 1, wherein the annular flange includes a lip that protrudes from the CMC body.

5. The article as recited in claim 1, wherein the gas turbine engine component is an airfoil.

6. An article comprising:
    a gas turbine engine component having
        a ceramic matrix composite (CMC) body including a fiber layer circumscribing a cavity, and
        a ceramic insert incorporated into the CMC body, the ceramic insert bordering the cavity, wherein the fiber layer is braided around the ceramic insert so as to be in contact with, and conform to, periphery surfaces of the ceramic insert.

* * * * *